Nov. 19, 1935.  H. S. HEICHERT  2,021,183
GLASS HANDLING APPARATUS
Filed Dec. 18, 1933  4 Sheets-Sheet 1
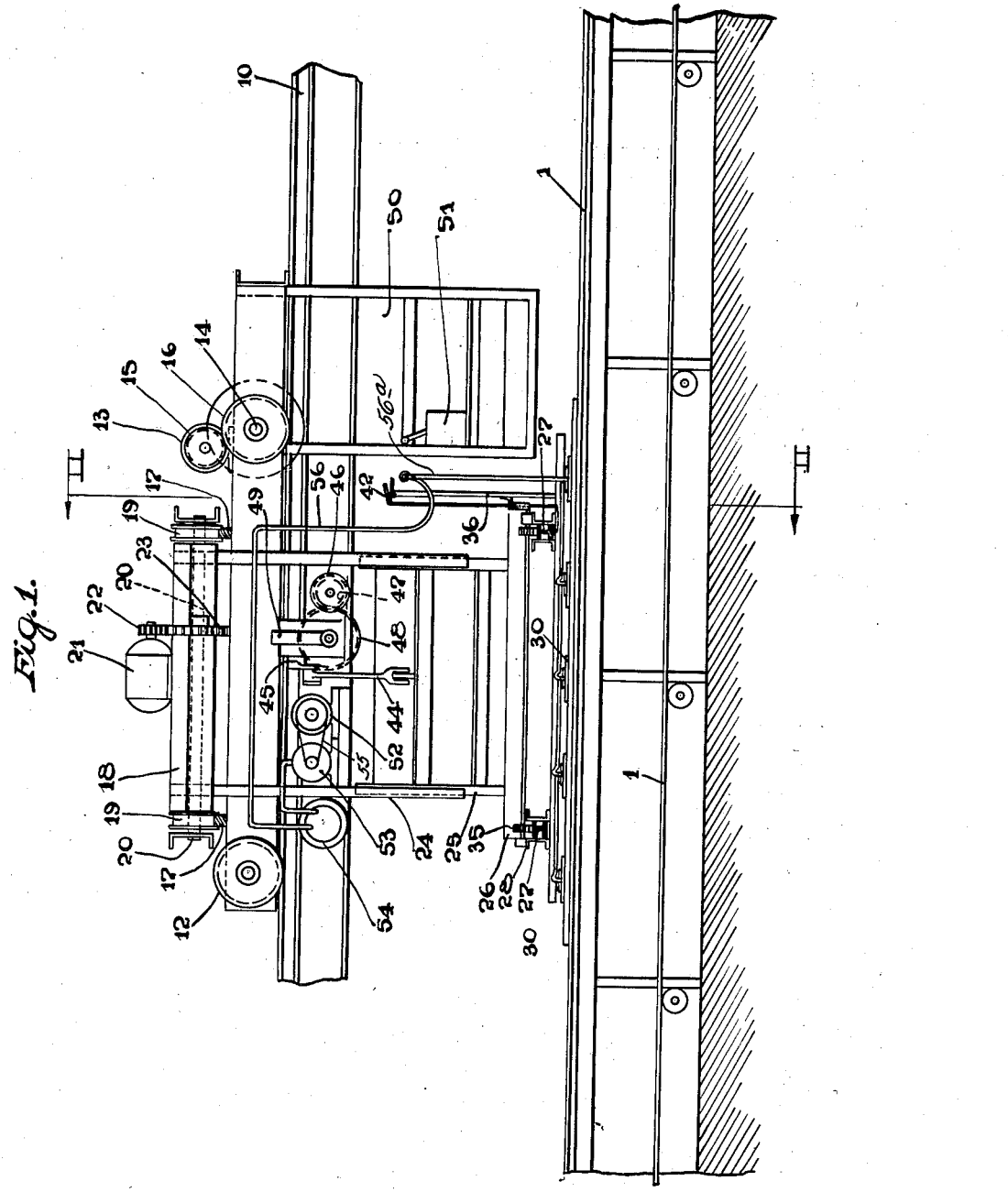
INVENTOR
H. S. Heichert
BY Bradley & Bee
ATTORNEYS.

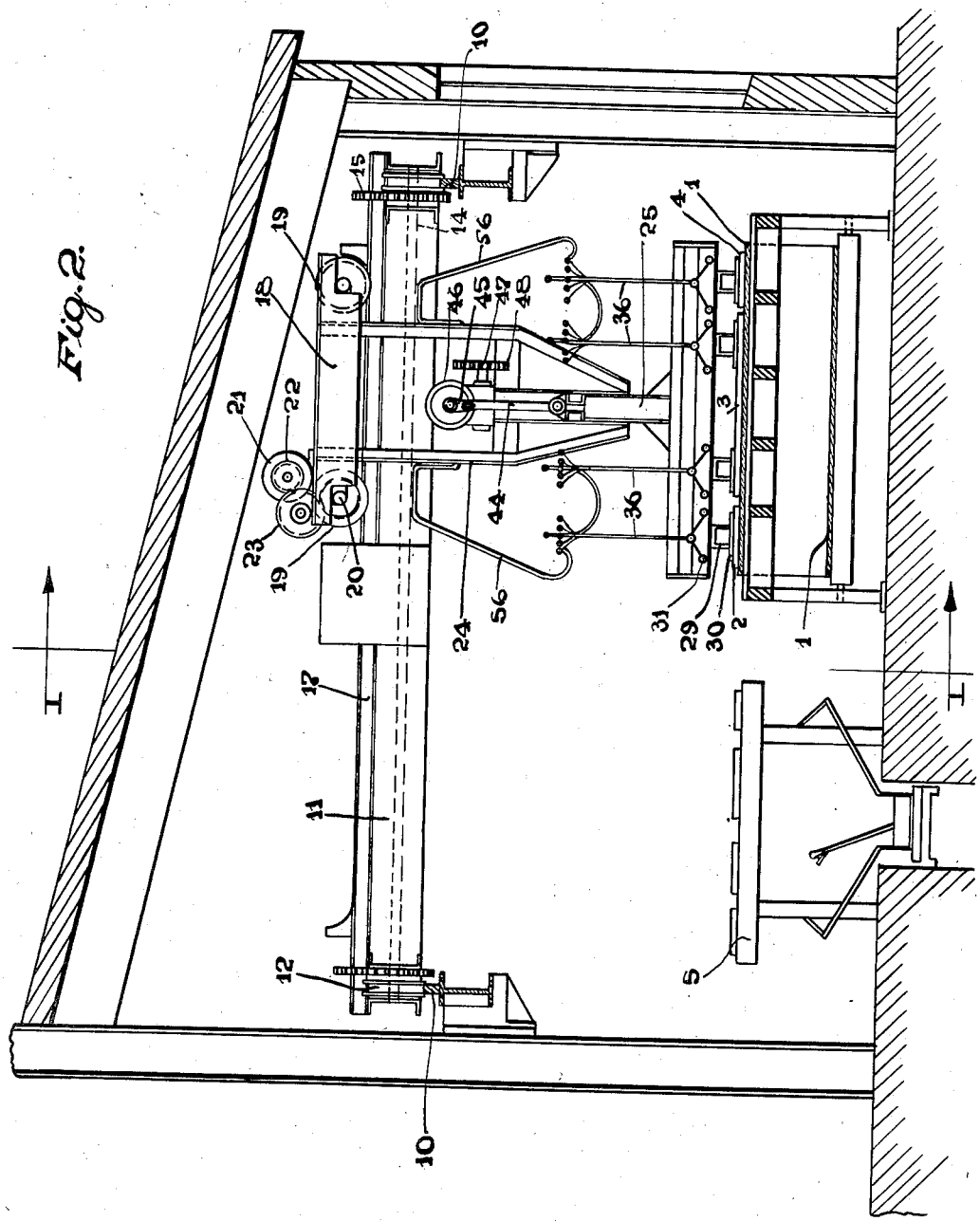

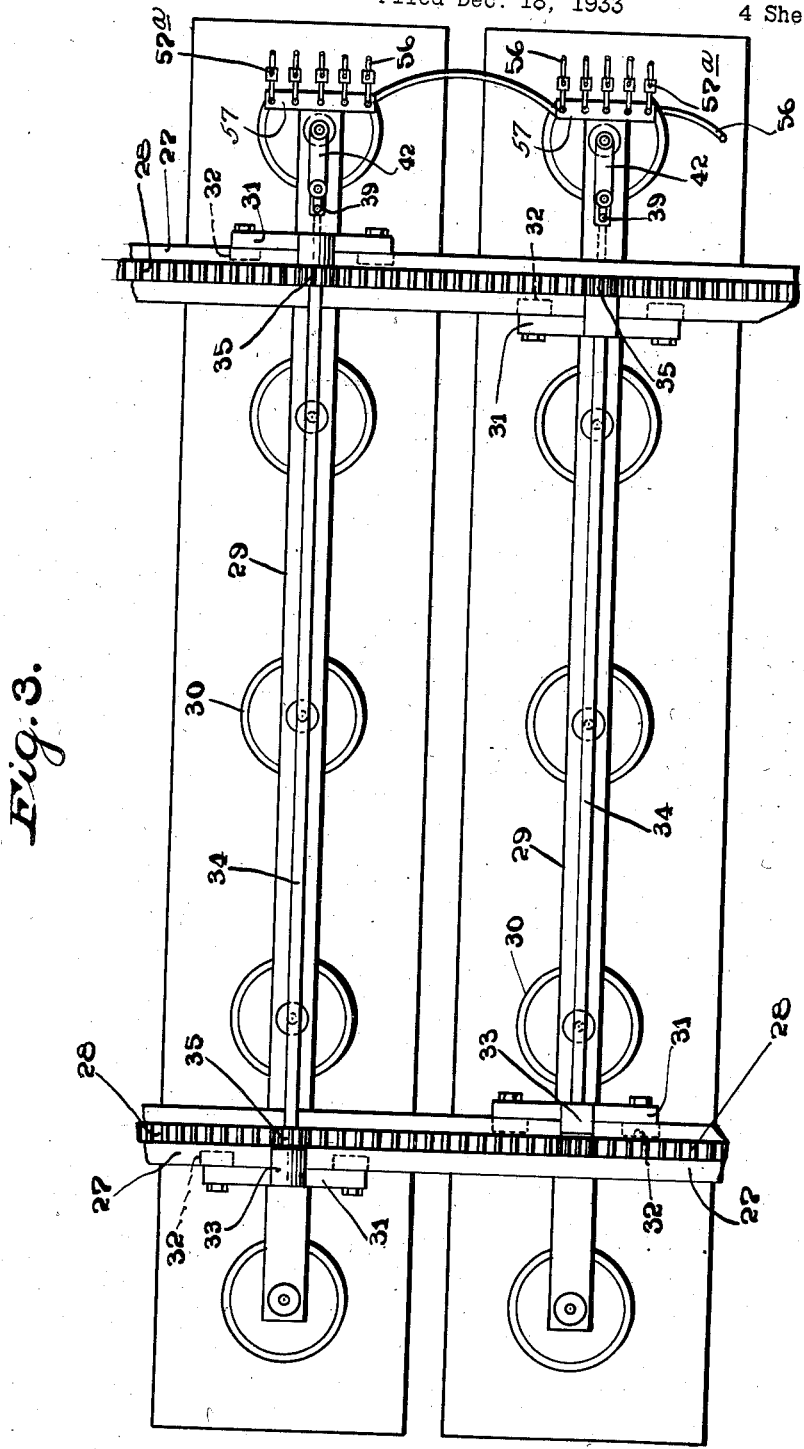

Nov. 19, 1935.   H. S. HEICHERT   2,021,183
GLASS HANDLING APPARATUS
Filed Dec. 18, 1933   4 Sheets-Sheet 4
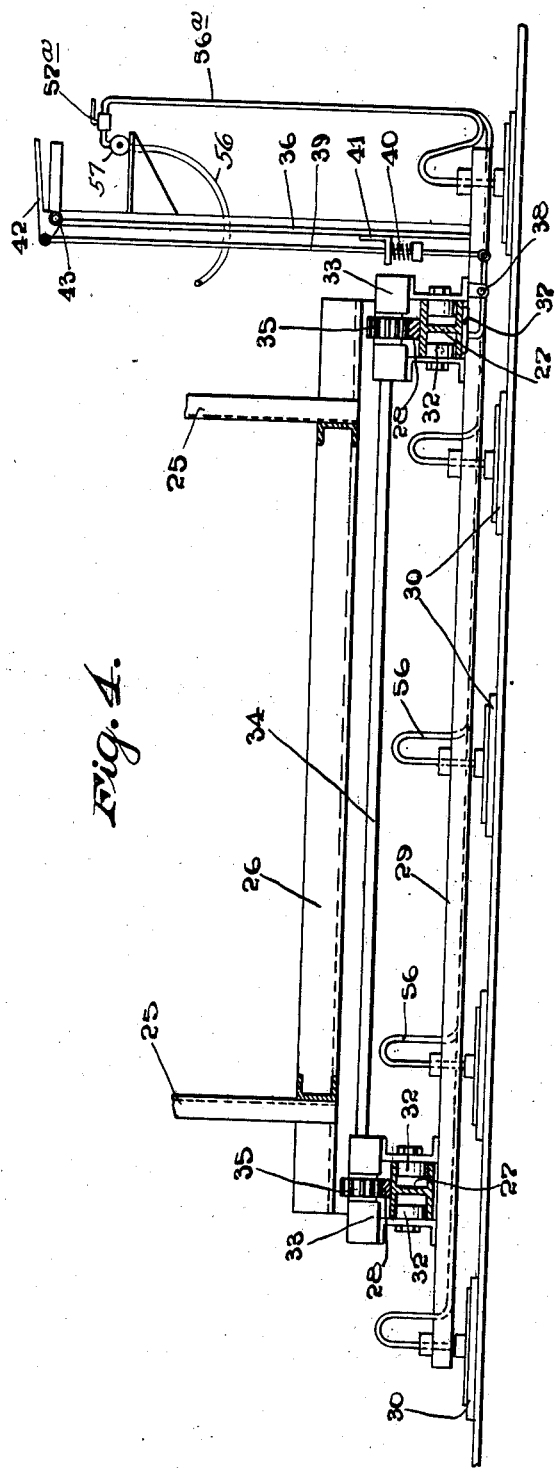
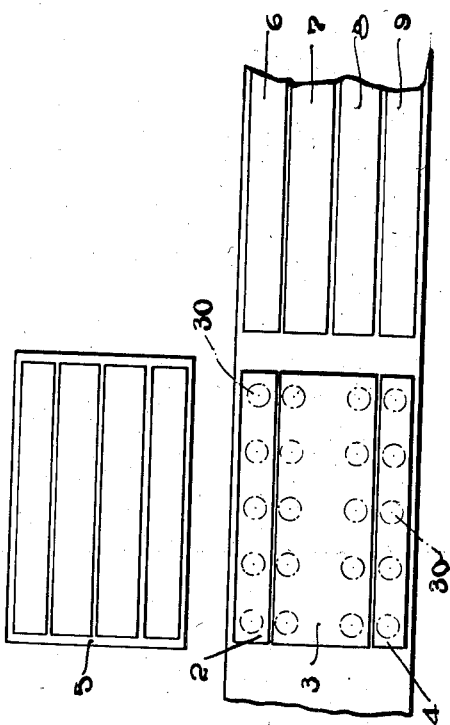

Patented Nov. 19, 1935

2,021,183

UNITED STATES PATENT OFFICE 2,021,183

GLASS HANDLING APPARATUS

Herman S. Heichert, Pittsburgh, Pa., assignor to Pittsburgh Plate Glass Company, a corporation of Pennsylvania Application December 18, 1933, Serial No. 702,841

2 Claims. (Cl. 212—11)

The invention relates to apparatus for handling flat sheets of glass and particularly for transferring glass strips of varying width from a conveyor to the cutting table at the side of the conveyor. The invention has for its objects the provision of an improved apparatus, which is flexible in operation and will safely handle a plurality of glass strips at one time regardless of their width, and which can be easily operated by a single operator who rides in the conveyor cage and controls all of the movements of the apparatus from such point. One embodiment of the invention is illustrated in the accompanying drawings, wherein:

Figure 1 is a section on the line I—I of Fig. 2.
Fig. 2 is a section on the line II—II of Fig. 1.
Fig. 3 is a partial plan view on an enlarged scale.
Fig. 4 is a side elevation of the apparatus of Fig. 3. And Fig. 5 is a plan view of the conveyor and cutting table showing the character of the glass strips which are handled by the apparatus.

Referring to the drawings, 1 is an endless belt conveyor which brings the glass strips 2, 3, 4, etc. (Fig. 5) to a position opposite the glass cutting table 5. The apparatus to which the present invention relates particularly is the transfer means for removing the glass strips 2, 3, 4, etc. from the endless belt and placing them upon the table 5 where they are duly cut into shorter lengths and then removed to the holding racks. The endless conveyor 1 brings the strips of glass to be handled from the cutting or stripping machine which divides the original sheets into strips 2, 3, 4, etc. The handling apparatus, including the vacuum frame, later described, is so constructed that the entire set of strips 2, 3 and 4 may be lifted at one time from the conveyor and transferred to the cutting table. The vacuum frame is so constructed that all of the strips may be thus transferred regardless of their width, which width will change depending on how the sheets are cut into strips in order to avoid defects or in order to give strips of the desired width. As indicated in Fig. 5, the set of strips 6, 7, 8 and 9 immediately following the strips 2, 3 and 4 constitute an entirely different set in so far as the lines of cut are concerned, but such strips are readily handled all at one time by the apparatus by simply adjusting the bars which carry the vacuum cups, as later described.

Mounted above the conveyor in parallel therewith is a track consisting of the rails 10, 10 on which is mounted a carriage 11 provided with the wheels 12 which engage the rails. This carriage is moved along the rails 10 from the motor 13 which drives one of the shafts 14 carrying the wheels 12 through the intermediary of the reduction gearing 15, 16. The carriage 11 is provided with a track consisting of the rails 17, 17 which extend transversely of the conveyor 1 and on this track is mounted a crane 18, such crane being adapted to move from a position, as shown in Fig. 2, to a position over the cutting table 5. The crane moves back and forth from one position to the other in transferring the strips 2, 3, 4, etc. from the conveyor to the table.

The crane 18 is provided with wheels 19, 19 which engage the rails 17, 17, and the shaft 20 of one of these pairs of wheels is driven from a motor 21 through the intermediary of suitable reduction gearing, indicated by the reference numerals 22 and 23. The crane is provided with a depending guide frame 24 made up of angle irons and in this guide frame is mounted for vertical movement a frame 25 carrying at its lower end the transverse beams 26 (Fig. 1). Secured to the lower side of the beams 26 and extending transversely thereof is a pair of I-beams 27, 27, each of which is provided on its upper side with a rack 28 (Fig. 3). Extending transversely of the I-beams 27 and lying beneath such beams is a set of four bars 29, 29, 29, 29, each of which carries a series consisting of five vacuum cups 30, 30, 30, etc. Each of the bars 29 is provided with a trolley 31 having a pair of wheels 32 fitting between the flanges of the I-beams which beams constitute tracks for the trolleys. Secured to the upper sides of the trolleys are suitable bearings 33, 33, and in these bearings are journalled the transverse shafts 34 which are provided adjacent their ends with the pinions 35, 35 meshing with the racks 28, 28. Each of the bars 29 is provided at its end with an upstanding handle 36 which may be grasped by the operator in order to move the bar along the tracks 28, 28 so that the vacuum cups carried by the bar will lie at the proper position with respect to the glass strip which is to be raised. The bars are each normally held against movement longitudinally of the racks 28, 28 by means of a brake 37 pivoted at 38 (Fig. 4) on the I-beam 27 and engaging the lower side of the bar 29. This engagement is secured by means of a rod 39 pressed downward by a spring 40, the upper side of which spring engages an angle 41 carried by the handle 36. The rod 39 is moved upward to release the brake by means of the handle 42 which is pivoted to the handle 36 at 43. When the brake is released, the bar which carries the brake may be moved along the I-beams 27, and during such movement, the bar is maintained at right angles to the I-beams 27, 27 by reason of the shaft 34 with its pinions 35 which engage the racks.

The frame 25 is moved vertically in the guide frame 24 in order to raise and lower the vacuum frame by means of a connecting rod 44 secured to its upper end to a crank 45. This crank is operated from a motor 46 carried by the frame through the intermediary of the gears 47 and 48, and worm gearing in the casing 49. In order to raise the frame and lift the glass strips 2, 3, and 4 from the conveyor, the crank 45 is rotated through an angle of 180 degrees. After the glass has thus been lifted by the vacuum frame, and such frame has been moved to a position over the cutting table 5, a further rotation of the crank through 180 degrees lowers the glass strips onto the cutting table. After the glass is released from the vacuum cups, the crank is rotated to lift the vacuum frame and the crane is moved back to its position over the conveyor.

The apparatus is controlled from a suitable cage 50 which depends from the carriage 11. The operator sits in this cage, and by means of suitable controllers 51, one only of which is shown, governs the movements of the motors 13, 21 and 46. He is also in position to grasp the upper ends of the handles 36 and move each of the bars 29 to a position such that the vacuum cups carried thereby may be positioned to the best advantage for engaging and lifting one of the glass strips on the conveyor.

Vacuum for operating the cups 30 is supplied by apparatus carried by the crane, including the electric motor 52, and the compressor 53 operated from the motor by means of the belt 55. The vacuum tank 54 is connected by means of the pipes 56 with the headers 57, 57 mounted at the front side of the cage 50. Each vacuum cup is connected with the headers by means of one of the pipes 56a having a suitable control valve 57a.

In operation, when it is desired to remove the set of strips 2, 3 and 4 from the forwardly moving conveyor and transfer them to the table 5, the vacuum frame is positioned over the conveyor, and the motor 13 is operated to cause the carriage 11 to move forward at the same speed as the conveyor. The operator now moves the bars 29 which carry the vacuum cups so that the cups are positioned, as indicated in Fig. 5, one set of cups being arranged over each of the strips 2 and 4, and two sets of cups being arranged over the strip 3. The motor 48 is then operated to lower the vacuum frame so that the cups engage the strips of glass therebeneath. The cups are then exhausted and the motor 48 operated to raise the vacuum frame, thus lifting the strips of glass from the conveyor. The motor 21 is then operated to move the crane 18 over the top of the table 5 where the vacuum frame is lowered and the strips of glass released from the cups, thus completing the operation. The apparatus is then moved back into position over the conveyor and prepared to similarly handle the oncoming set of strips 6, 7, 8 and 9. In handling these strips, one of the bars carrying the vacuum cups is arranged over the center line of each of the strips and the operation is carried out as heretofore described.

What I claim is:

1. In a glass handling apparatus which includes a support mounted for lateral movement and a guide frame depending therefrom, the combination of: a vacuum frame mounted for vertical movement on the guide frame, means for moving the vacuum frame vertically, a horizontal track carried by the vacuum frame, and comprising a pair of parallel racks, a plurality of bars extending transversely of the track and each provided with a plurality of vacuum cups mounted in series therealong, and a shaft carried by each bar provided at its ends with pinions engaging the racks.

2. In a glass handling apparatus which includes a support mounted for lateral movement and a guide frame depending therefrom, the combination of: a vacuum frame mounted for vertical movement on the guide frame, means for moving the vacuum frame vertically, a horizontal track carried by the vacuum frame, and comprising a pair of parallel racks, a plurality of bars extending transversely of the track and each provided with a plurality of vacuum cups mounted in series therealong, a shaft carried by each bar provided at its ends with pinions engaging the racks, and a manually operable locking means carried by each bar for clamping it at any position to which it is adjusted along the track.

HERMAN S. HEICHERT.